(12) United States Patent
Kim et al.

(10) Patent No.: US 11,579,775 B2
(45) Date of Patent: Feb. 14, 2023

(54) STORAGE SYSTEM AND METHOD OF OPERATING THE SAME

(71) Applicants: Dong-Gun Kim, Hwaseong-si (KR); Won-Moon Cheon, Hwaseong-si (KR)

(72) Inventors: Dong-Gun Kim, Hwaseong-si (KR); Won-Moon Cheon, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 552 days.

(21) Appl. No.: 15/789,424

(22) Filed: Oct. 20, 2017

(65) Prior Publication Data

US 2018/0113629 A1 Apr. 26, 2018

(30) Foreign Application Priority Data

Oct. 24, 2016 (KR) .......................... 10-2016-0138401

(51) Int. Cl.

| | |
|---|---|
| *G06F 3/06* | (2006.01) |
| *G06F 12/0868* | (2016.01) |
| *G06F 12/06* | (2006.01) |
| *G06F 12/0831* | (2016.01) |

(Continued)

(52) U.S. Cl.
CPC .......... *G06F 3/0611* (2013.01); *G06F 3/0659* (2013.01); *G06F 3/0685* (2013.01); *G06F 12/0638* (2013.01); *G06F 12/0831* (2013.01); *G06F 12/0868* (2013.01); *G06F 12/0891* (2013.01); *G06F 12/1009* (2013.01); *G06F 2212/1024* (2013.01); *G06F 2212/205* (2013.01); *G06F 2212/621* (2013.01)

(58) Field of Classification Search
CPC .. G06F 3/0659; G06F 12/0638; G06F 3/0685; G06F 12/0868; G06F 3/0611; G06F 12/0891; G06F 2212/205; G06F 2212/1024; G06F 12/0831; G06F 12/1009; G06F 2212/621

USPC ......................................................... 711/102
See application file for complete search history.

(56) References Cited

U.S. PATENT DOCUMENTS

| | | |
|---|---|---|
| 7,139,874 B1 | 11/2006 | Milillo et al. |
| 8,397,024 B2 | 3/2013 | Fasoli et al. |
| 8,452,912 B2 | 5/2013 | Lee et al. |

(Continued)

OTHER PUBLICATIONS

S. Ghandeharizadeh, et al., "Host Side Caching: Solutions and Opportunities," *Database Laboratory Technical Report* Feb. 2015, Computer Science Department, USC, Los Angeles, California 90089-0781, Mar. 29, 2016.

*Primary Examiner* — Hua J Song
(74) *Attorney, Agent, or Firm* — Harness, Dickey & Pierce, P.L.C.

(57) ABSTRACT

A storage system includes a storage device and a host device. The storage device includes a nonvolatile memory device having a first size and a first volatile memory device having a second size smaller than the first size and configured to operate as a cache memory with respect to the nonvolatile memory device. The first volatile memory device is configured to allow a first bus portion access to cache data stored in the first volatile memory device. The host device is configured to generate a cache table corresponding to information in the cache data stored in the first volatile memory device and configured to read the cache data stored in the first volatile memory device via the first bus portion based on the cache table.

17 Claims, 10 Drawing Sheets

(51) Int. Cl.
*G06F 12/0891* (2016.01)
*G06F 12/1009* (2016.01)

(56) References Cited

U.S. PATENT DOCUMENTS

| | | |
|---|---|---|
| 8,620,886 B1 | 12/2013 | Madan et al. |
| 8,723,877 B2 | 5/2014 | Munshi et al. |
| 9,215,283 B2 | 12/2015 | Hampel et al. |
| 9,274,865 B2 | 3/2016 | Furlong |
| 2012/0249345 A1* | 10/2012 | Yanada ............... H03M 7/00 341/50 |
| 2013/0318283 A1 | 11/2013 | Small et al. |
| 2014/0059292 A1 | 2/2014 | Phelan et al. |
| 2015/0153965 A1* | 6/2015 | Park ................... G06F 11/10 711/154 |
| 2016/0026406 A1* | 1/2016 | Hahn ................. G06F 3/0631 711/103 |

* cited by examiner

| V_ADDR_C | P_ADDR_C |
|---|---|
| ADDR_a | ADDR_A |
| ADDR_b | ADDR_B |
| ⋮ | ⋮ |

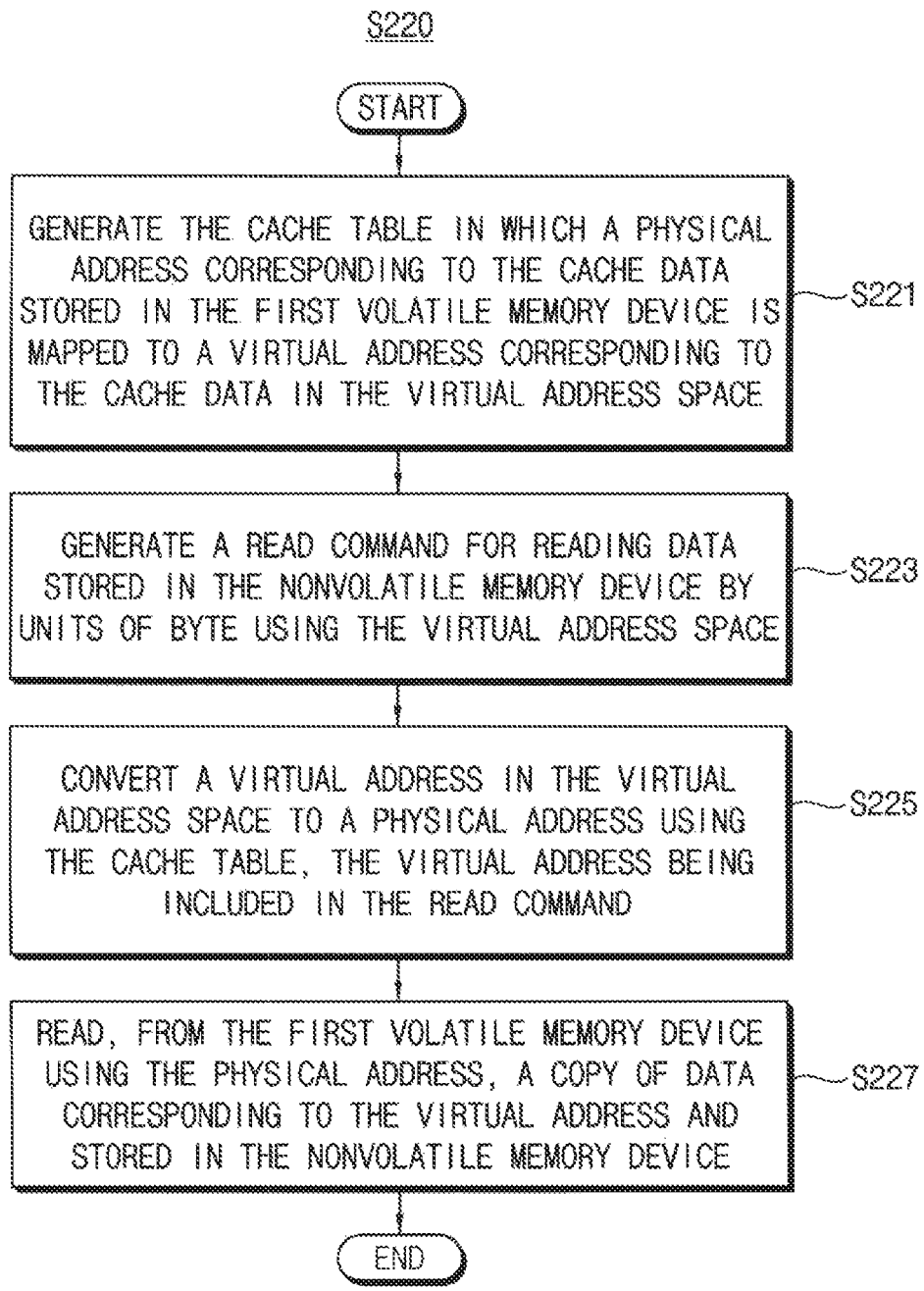

STORAGE SYSTEM AND METHOD OF OPERATING THE SAME

CROSS-REFERENCE TO RELATED APPLICATION

This U.S. Non-provisional application claims priority under 35 USC § 119 to Korean Patent Application No. 10-2016-0138401, filed on Oct. 24, 2016, in the Korean Intellectual Property Office (KIPO), the disclosure of which is incorporated by reference in its entirety herein.

BACKGROUND

1. Technical Field

Example embodiments of the inventive concepts relate generally to a storage system, and more particularly to a method of implementing a cache in a storage system including a host device and a storage device.

2. Discussion of the Related Art

A typical storage device uses nonvolatile memory as storage medium and thus it takes much time for a host device to read data from a storage device. To solve the problem of long read times, a storage device may include a hardware cache. In this case, the storage device may reduce the read time by storing the data of high access frequency in the hardware cache or a cache memory. However, as storage capacity of the nonvolatile memory in the storage device is increased, also cost for the hardware cache is increased. A solution without a hardware cache may lower the costs.

SUMMARY

Some example embodiments may provide a storage system including a host-level cache.

Some example embodiments may provide a method of operating a storage system including a host-level cache.

According to some example embodiments, a storage system includes a storage device and a host device. The storage device includes a nonvolatile memory device having a first size and a first volatile memory device having a second size smaller than the first size and configured to operate as a cache memory with respect to the nonvolatile memory device. The first volatile memory device is configured to allow a first bus portion to access to cache data stored in the first volatile memory device. The host device is configured to generate a cache table corresponding to information on the cache data stored in the first volatile memory device and configured to read the cache data stored in the first volatile memory device via the first bus portion based on the cache table.

According to some example embodiments, a storage device includes a nonvolatile memory device having a first size and a first volatile memory device having a second size smaller than the first size and operating as a cache memory with respect to the nonvolatile memory device. The storage device implements a first interface to allow a first bus portion access to cache data stored in the first volatile memory device. The host device may read the cache data stored in the first volatile memory device via the first bus portion based on a cache table corresponding to information on the cache data stored in the first volatile memory device.

Example embodiments of the inventive concepts show a storage device including a nonvolatile memory device having a first size, a volatile memory device having a second size smaller than the first size and a storage controller. The volatile memory device is configured to store cache data for the nonvolatile memory device and to transmit data to a host in response to a request from the host. The storage controller is configured to perform one of the following based on the command from the host, load data stored in the nonvolatile memory device to the volatile memory device, transfer data stored in the volatile memory device to the nonvolatile memory device, or delete the data stored in the volatile memory device.

In the storage system according to example embodiments, even though the storage system does not include a hardware cache, the host device may read the data stored in the nonvolatile memory device by units of byte though the first volatile memory device using the cache table that is generated and stored internally.

BRIEF DESCRIPTION OF THE DRAWINGS

Example embodiments of the present disclosure will be more clearly understood from the following detailed description taken in conjunction with the accompanying drawings.

FIG. 3 is a diagram illustrating an example of a cache table that is stored in a host device in FIG. 2.

FIG. 11 is a flow chart illustrating an example embodiment of reading cache data stored in a first volatile memory device by units of byte via the first bus portion based on a cache table, which is included in the method of FIG. 10.

DETAILED DESCRIPTION OF THE EMBODIMENTS

Figure 1:
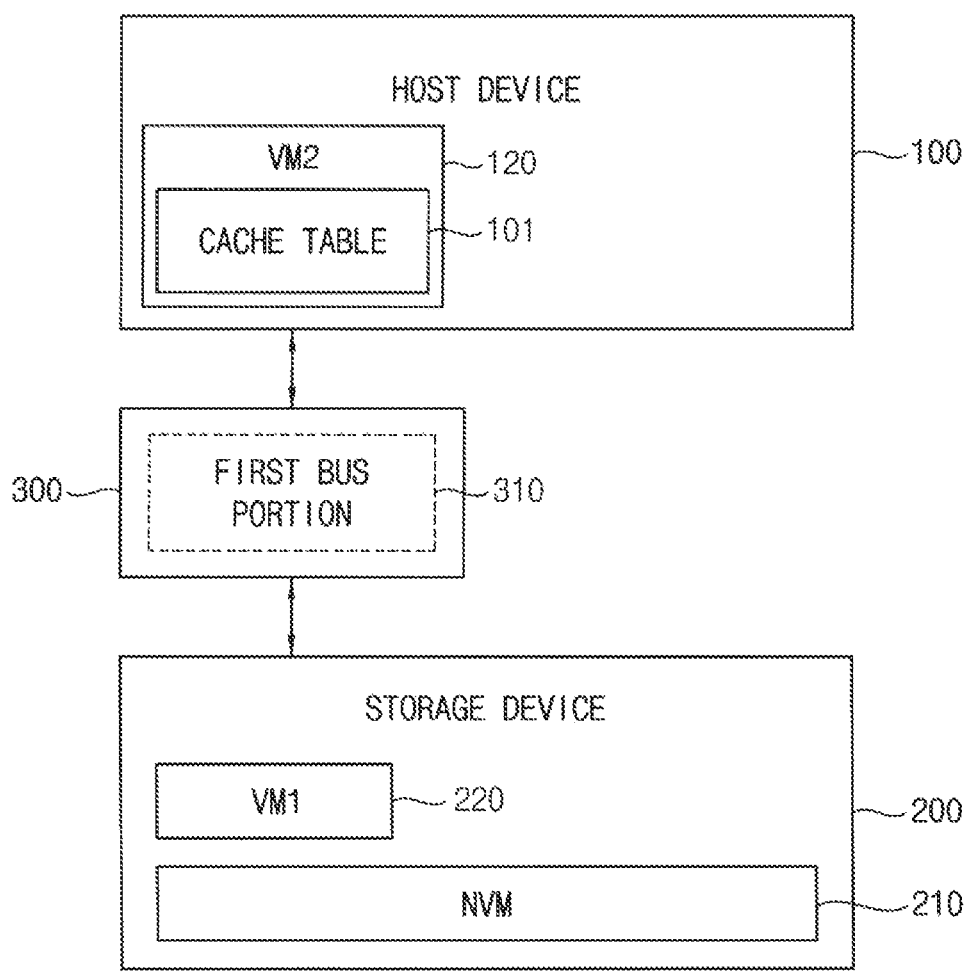
FIG. 1 is a block diagram illustrating a storage system according to example embodiments.

Various example embodiments will be described more fully hereinafter with reference to the accompanying drawings, in which some example embodiments are shown. In the drawings, like numerals refer to like elements throughout. Repeated descriptions may be omitted.

FIG. 1 is a block diagram illustrating a storage system according to example embodiments.

Referring to FIG. 1, a storage system 10 includes a host device 100 and a storage device 200. The storage device 200 includes a nonvolatile memory device NVM 210 and a first volatile memory device VM1 220, The host device includes a second volatile memory device 120.

In some example embodiments, the storage device 200 may be a solid state drive (SSD) but is not limited thereto. According to example embodiments, the storage device 200 may be a storage device of an arbitrary type.

The storage capacity of the nonvolatile memory device 210 may correspond to a first size. In some example embodiments, the nonvolatile memory device 100 may be a flash memory device but is not limited thereto. According to example embodiments, the nonvolatile memory device 210 may be implemented with phase change random access memory (PRAM), resistance random access memory (RRAM), magnetic random access memory (MRAM), ferroelectric random access memory (FRAM), etc.

The storage capacity of the first volatile memory device 220 may correspond to a second size smaller than the first size. In addition, the first volatile memory device 220 may operate or function as a cache memory with respect to the nonvolatile memory device 210. In some example embodiments, the first volatile memory device 220 may be a dynamic random access memory (DRAM) device but is not limited thereto. According to example embodiments, the first volatile memory device 220 may be a volatile memory device of an arbitrary type such as a static random access memory (SRAM) device.

In some example embodiments, the host device 100 may communicate with and the first volatile memory device 220 in the storage device 200 through a bus such as a Peripheral Component Interconnect Express (PCIe) bus 300 as shown in FIG. 1.

The storage device 200 may implement a first interface to allow a first bus portion 310 access to cache data stored in the first volatile memory device 220. The first bus portion 310 is a portion of the bus 300 through which the host may communicate with the storage device. The first bus portion 310 may include the entire bus 300 or may include only a portion of the bus 300. The first bus portion 310 may have a width that is evenly divisible into bytes. The first volatile memory device 220 may allow the first bus portion 310 access to cache data stored in the first volatile memory device 220.

The host device 100 may generate a cache table 101, in the second non-volatile memory device 120, corresponding to information on the cache data stored in the first volatile memory device 220. The host device 100 may read the cache data stored in the first volatile memory device 220 by units of byte via the first bus portion 310 of the PCI bus 300 based on the cache table 101.

As such, the first volatile memory device 220 included in the storage device 200 may operate as the cache memory with respect to the nonvolatile memory device 210 and, based on the cache table 101 that is generated internally, the host device 100 may read the cache data stored in the first volatile memory device 220 by units of byte using the first bus portion 310 of the PCIe bus 300.

Accordingly in the storage system 10 according to some example embodiments, even though the storage system 10 does not include a hardware cache, the host device 100 may read the data stored in the nonvolatile memory device 210 by units of byte though the first volatile memory device 220 using the cache table 101 that may be generated and stored in the second volatile memory device 120.

Figure 2:
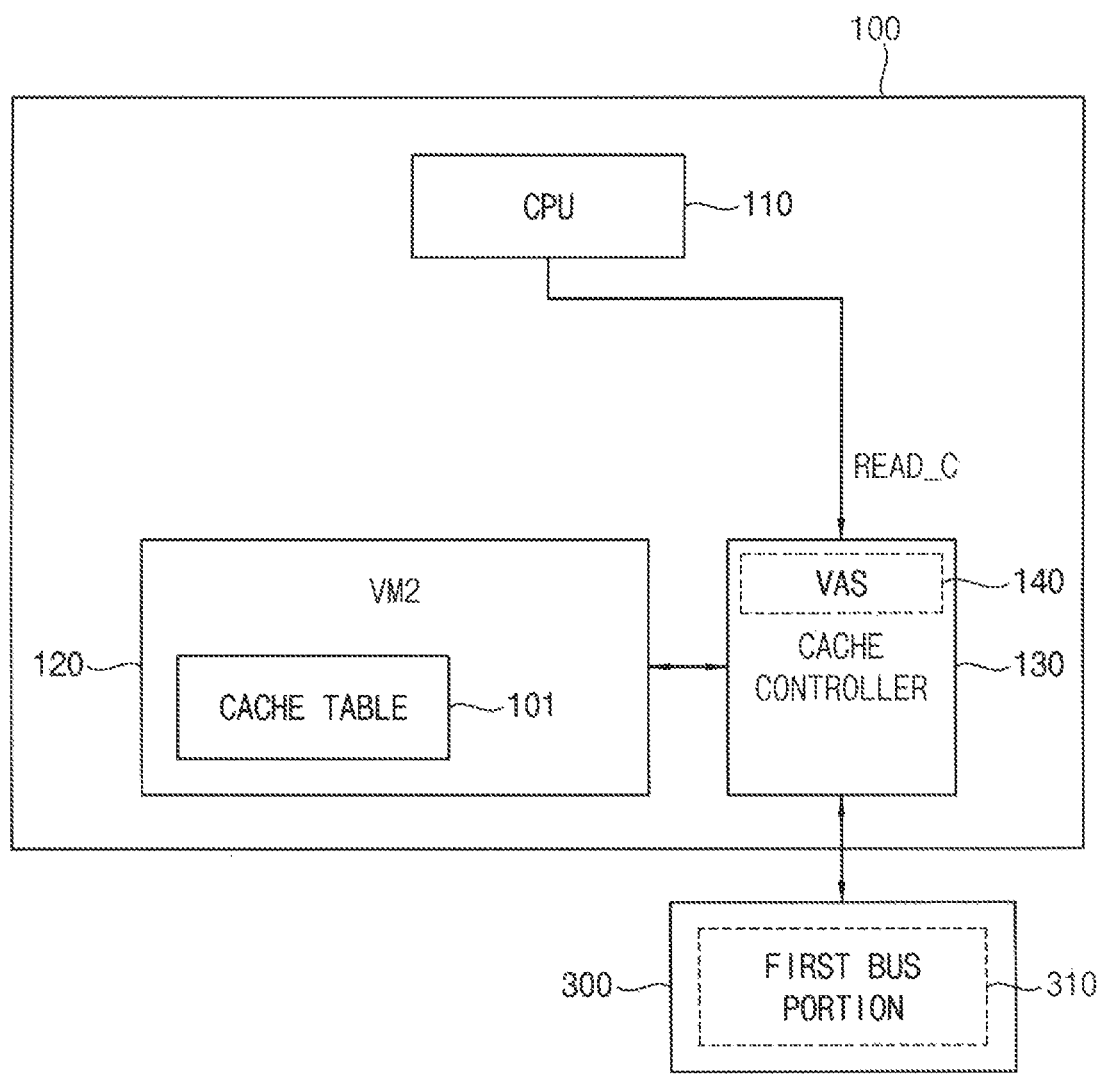
FIG. 2 is a block diagram illustrating an example embodiment of a host device included in the storage system of FIG. 1.

FIG. 2 is a block diagram illustrating an example embodiment of a host device included in the storage system of FIG. 1.

Referring to FIG. 2, a host device 100 may include a processor 110 such as a central processing unit (CPU), a second volatile memory device 120 and a cache controller 130.

The processor 110 may control overall operations of the storage system 10. For example, the processor 110 may execute applications such as a web browser, a game application, a video player, etc. In some embodiments, the processor 110 may include a single core or multiple cores. For example, the processor 110 may be a multi-core processor, such as a dual-core processor, a quad-core processor, a hexa-core processor, etc. The processor 110 may include an internal or external cache memory.

While executing the applications, the processor 110 may generate a read command READ_C for reading data stored in the nonvolatile memory device 210 by units of byte using a virtual address space 140 having a size sufficient to hold an address unique to a block of the nonvolatile memory device 210. The data in the nonvolatile memory device are stored in blocks. The cache controller 130 may implement the virtual address space (VAS) 140 and provide the virtual address space 140 to the processor 110. It is also contemplated that the virtual address space 140 may be implemented in other hardware elements of the host device 100. In addition, the cache controller 130 may read the cache data stored in the first volatile memory device 220 using the first bus portion 310 of the PCIe bus 300.

The cache controller 130 may generate the cache table 101 in which a first address corresponding to the cache data stored in the first volatile memory device 220 in the first bus portion 310 is mapped to a second address corresponding to the cache data in the virtual address space 140. The cache controller 130 may store the cache table 101 in the second volatile memory device 120. In some example embodiments, the second volatile memory device 120 may be a dynamic random access memory (DRAM) device but is not limited thereto. According to example embodiments, the second volatile memory device 120 may be a volatile memory device of an arbitrary type such as a static random access memory (SRAM) device.

Figure 3:
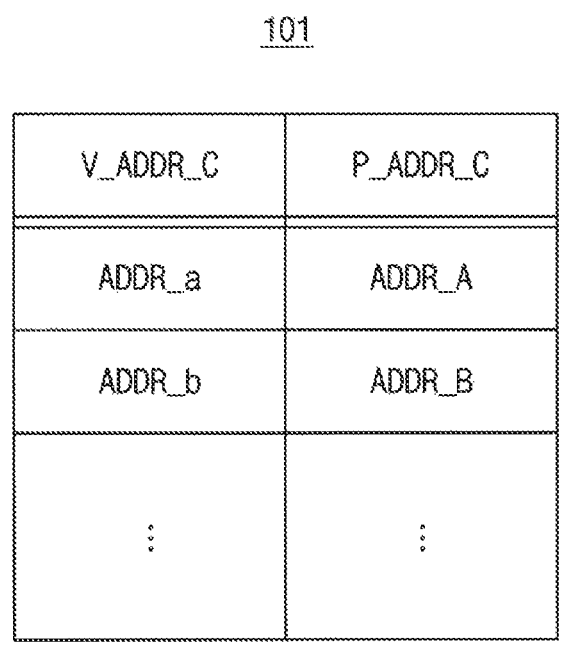

FIG. 3 is a diagram illustrating an example of a cache table that is stored in a host device in FIG. 2.

Referring to FIG. 3, a cache table 101 may include a virtual address column V_ADDR_C and a physical address column P_ADDR_C.

The cache table 130 may store the a virtual address and a physical address corresponding to the cache data stored in the first volatile memory device 220 such that the virtual address in the virtual address space 140 may be mapped to the physical address in the first bus portion 310.

For example, as illustrated in FIG. 3, the virtual address corresponding to first cache data in the virtual address space 140 may be ADDR_a and the physical address corresponding to the first cache data in the first bus portion 310 may be ADDR_A. In the same way, the virtual address corresponding to second cache data in the virtual address space 140 may be ADDR_b and the physical address corresponding to the second cache data in the first bus portion 310 may be ADDR_B.

Referring back to FIG. 2, when the cache controller 130 receive the read command READ_C from the processor 110, the cache controller 130 may convert the virtual address in the virtual address space 140, which is included in the read command READ_C, to the physical address in the first bus portion 310 using the cache table 101. The cache controller 130 may read, from the first volatile memory device 220 using the physical address, a copy of data corresponding to the virtual address and stored in the nonvolatile memory device 210.

When the virtual address included in the read command READ_C received from the processor 110 exists in the cache table 101, the cache controller 130 may read the physical address corresponding to the virtual address from the cache table 101 and perform a read operation by units of byte with respect to a region corresponding to the physical address in the first volatile memory device 220. Accordingly the data read by units of byte from the first volatile memory device 220 may be a copy of the data corresponding to the virtual address and stored in the nonvolatile memory device 210.

When the virtual address included in the read command READ_C received from the processor does not exist in the cache table 101, the cache controller 130 may provide a load request signal to the storage device 200 to request to load the data corresponding to the virtual address and stored in the nonvolatile memory device 210 to the first volatile memory device 220. In response to the load request signal, the storage device 200 may load the data corresponding to the virtual address from the nonvolatile memory device 210 to the first volatile memory device 220 as the cache data.

The cache controller 130 may store, in the cache table, the virtual address and the physical address to which the cache data are loaded such that the virtual address may be mapped to the physical address and perform a read operation by units of byte with respect to a region corresponding to the physical address in the first volatile memory device 220. Accordingly the data read by units of byte from the first volatile memory device 220 may be a copy of the data corresponding to the virtual address and stored in the nonvolatile memory device 210.

The cache controller 130 may provide the copy of the data corresponding to the virtual address and stored in the nonvolatile memory device 210, which are read by units of byte from the first volatile memory device 220, to the processor 110.

Figure 4:
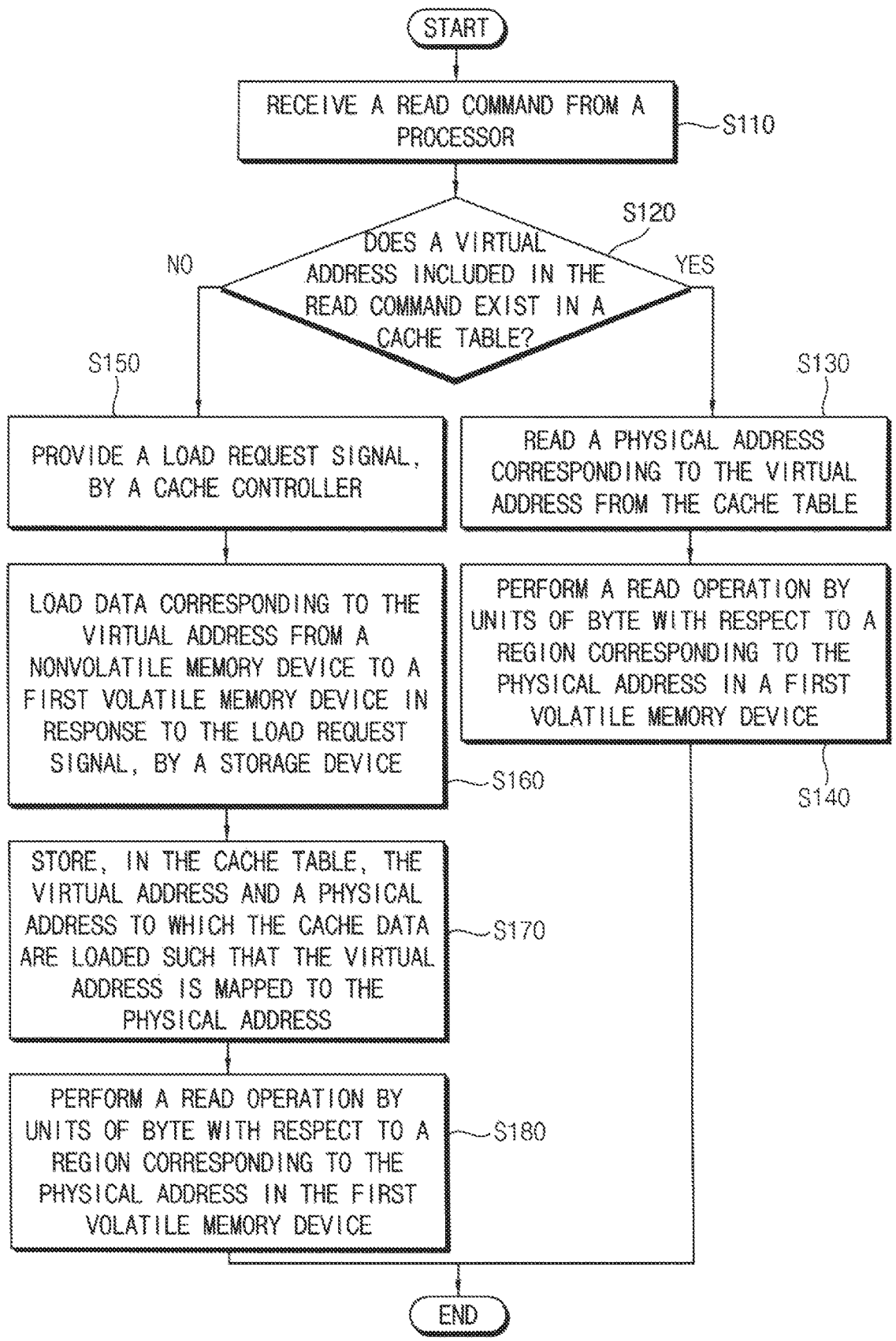
FIG. 4 is a flow chart illustrating an example embodiment of reading process in the storage system of FIG. 1.

FIG. 4 is a flow chart illustrating an example embodiment of reading process in the storage system of FIG. 1.

Referring to FIGS. 1 through 4, the storage device 100 may receive the read command READ_C (S110) that is generated by the processor 110 to read the data stored in the nonvolatile memory device 210 by units of byte using the virtual address space 140.

The cache controller 130 may determine whether the virtual address of the virtual address space 140 included in the read command READ_C exists in the cache table 101 (S120) that is stored in the second volatile memory device 120.

When the virtual address included in the read command READ_C received from the processor 110 exists in the cache table 101 (S120: YES), the cache controller 130 may read the physical address corresponding to the virtual address of the read command READ_C from the cache table 101 (S130) and perform a read operation by units of byte with respect to a region corresponding to the physical address in the first volatile memory device 220 (S140).

When the virtual address included in the read command READ_C received from the processor does not exist in the cache table 101 (S120: NO), the cache controller 130 may provide a load request signal to the storage device 200 to request to load the data corresponding to the virtual address and stored in the nonvolatile memory device 210 to the first volatile memory device 220 (S150).

In response to the load request signal, the storage device 200 may load the data corresponding to the virtual address from the nonvolatile memory device 210 to the first volatile memory device 220 as the cache data (S160).

The cache controller 130 may store, in the cache table 101, the virtual address and the physical address to which the cache data are loaded such that the virtual address may be mapped to the physical address (S170) and perform a read operation by units of byte with respect to a region corresponding to the physical address in the first volatile memory device 220 (S180).

Figure 5:
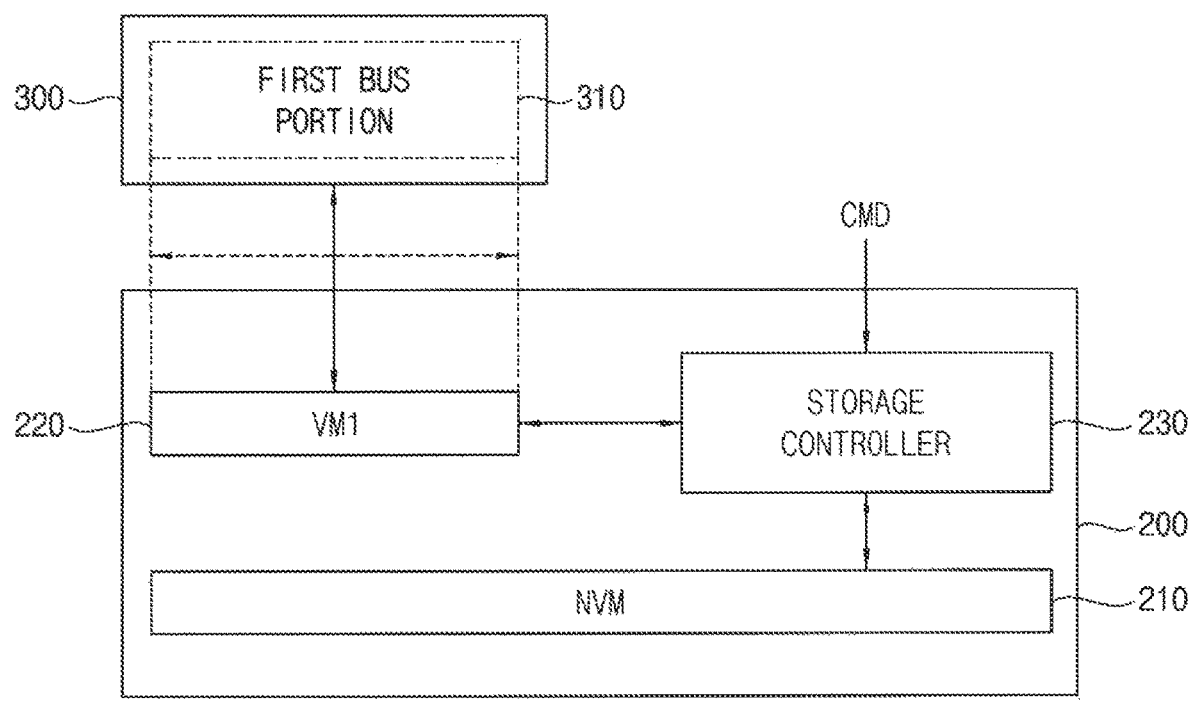
FIG. 5 is a block diagram illustrating an example embodiment of a storage device included in the storage system of FIG. 1.

FIG. 5 is a block diagram illustrating an example embodiment of a storage device included in the storage system of FIG. 1.

Referring to FIG. 5, a storage device 200 may include a nonvolatile memory device 210, a first volatile memory device 220 and a storage controller 230. The nonvolatile memory device 210 and first volatile memory device 220 are described above with reference to FIG. 1 and the repeated descriptions are omitted.

The storage controller 230 may receive a command signal CMD from the cache controller 130 included in the host device 100 of FIG. 2. The storage controller 230 may perform, based on the command signal CMD, at least one of a load operation to load data stored in the nonvolatile memory device 210 to the first volatile memory device 220 as the cache data, a clean operation to store the cache data stored in the first volatile memory device 220 to the nonvolatile memory device 210 and an invalidating operation to delete the cache data stored in the first volatile memory device 220.

Figure 6:
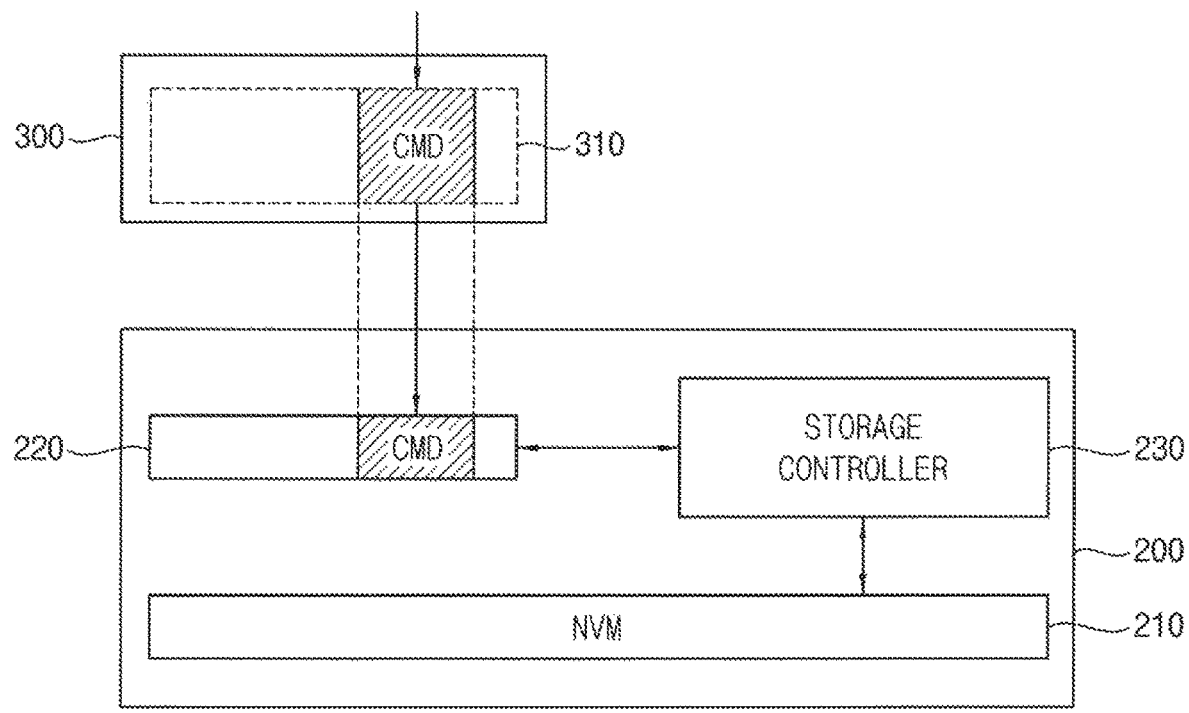
FIG. 6 is a diagram for describing an example operation of the storage system of FIG. 1.

FIG. 6 is a diagram for describing an example operation of the storage system of FIG. 1.

In some example embodiments, as illustrated in FIG. 6, the cache controller 130 may store the command signal CMD in a predetermined region of the first volatile memory device 220 using the first bus portion 310 of the PCIe bus 300. In this case, the storage controller 230 may perform at least one of the load operation, the clean operation and the invalidating operation based on the command signal CMD stored in the predetermined region of the first volatile memory device 220.

Figure 7:
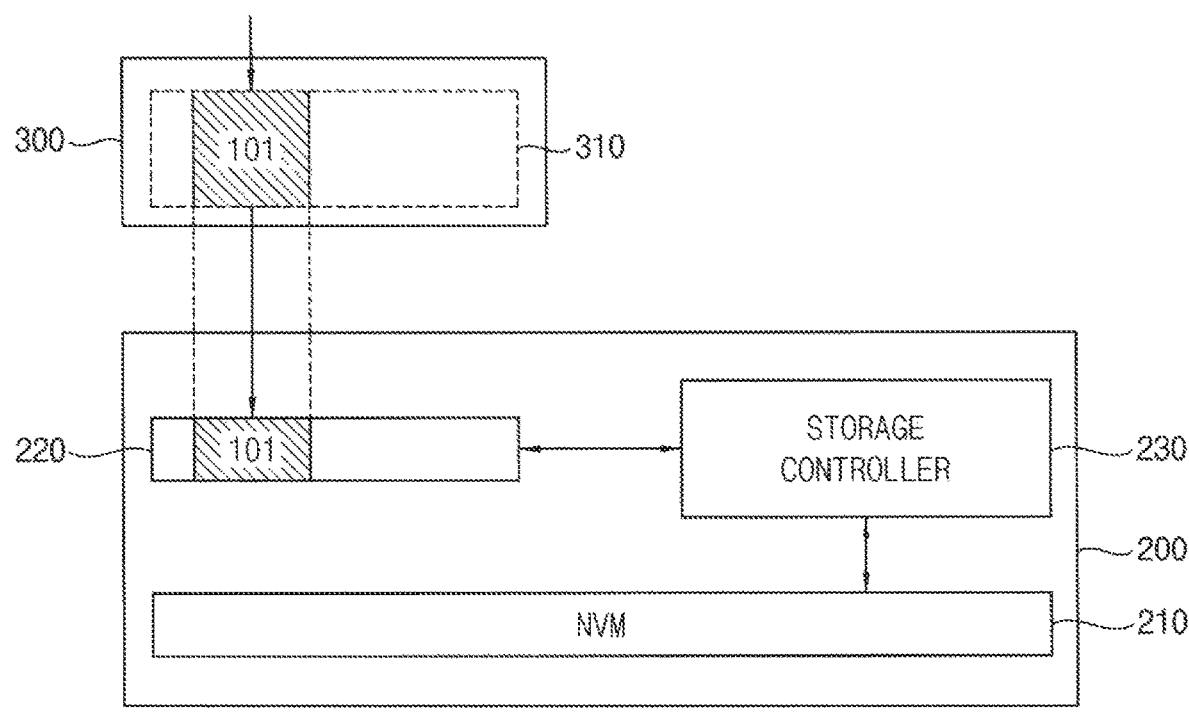
FIG. 7 is a diagram for describing another example operation of the storage system of FIG 1.

FIG. 7 is a diagram for describing another example operation of the storage system of FIG. 1.

In some example embodiments, as illustrated in FIG. 7, the cache controller 130 may copy and store the cache table 101 from the second volatile memory device 120 in the host device 100 of FIG. 2 to a predetermined region of the first volatile memory device 220 via the first bus portion 310 of the PCIe bus 300. In this case, the storage controller 230 may backup and store the cache table 101 from the predetermined region of the first volatile memory device 220 to the nonvolatile memory device 210 when the storage device is powered off. Accordingly the cache data and the cache table 101 stored in the first volatile memory device 220 operating as the cache memory with respect to the nonvolatile memory device 210 may be backed up safely in the nonvolatile memory device 210 even when the storage system 10 is powered off unexpectedly.

The storage controller 230 may restore the backed-up cache data in the nonvolatile memory device 210 to the first volatile memory device 220 when the storage device 200 is powered on. In addition, the storage controller 230 may restore the cache table 101 from the nonvolatile memory device 210 to the predetermined region of the first volatile memory device 220 when the storage device 200 is powered on. The cache controller 130 may copy the restored cache table 101 via the first bus portion 310 from the predetermined region of the first volatile memory device 220 to the second volatile memory device 120 when the storage device 200 is powered on.

Accordingly, when the storage system 10 is powered on, the cache data stored in the first volatile memory device 220 before the power-off and the cache table 101 stored in the second volatile memory device 120 before the power-off may be restored safely in the first volatile memory device 220 and the second volatile memory device 120, respectively. The processor 110 may read the data stored in the nonvolatile memory device 210 rapidly by units of byte, using the cache data and the cache table 101 that are restored in the first volatile memory device 220 and the second volatile memory device 120, respectively.

Figure 8:
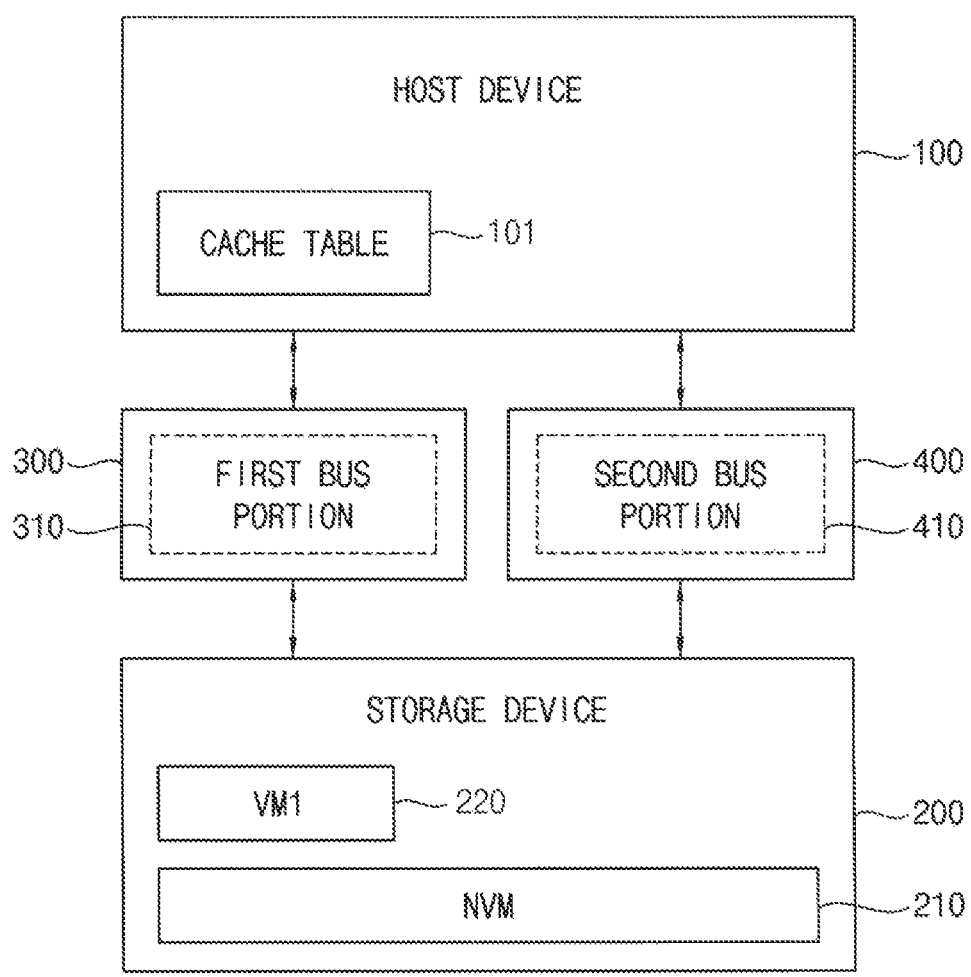
FIG. 8 is a block diagram illustrating a storage system according to example embodiments.

FIG. 8 is a block diagram illustrating a storage system according to example embodiments.

Referring to FIG. 8, a storage system 10a includes a host device 100 and a storage device 200. The storage system 10a of FIG. 8 is similar to the storage system 10 of FIG. 1, and the repeated descriptions are omitted.

In some example embodiments, the nonvolatile memory device 210 in the storage device 200 may be connected to the processor of the host device 100 through a second bus 400. The second bus 400 may be a serial advanced technology attachment (SATA) bus. In other example embodiments, the second bus may be a nonvolatile memory express (NVMe) bus. In still other example embodiments, the second bus 400 may be a serial attached SCSI (SAS) bus.

In addition to the above-described first interface, the storage device 200 may implement a second interface to allow a second bus portion access to data stored in the nonvolatile memory device 210. The second bus portion 410 is a portion of the second bus 400 through which the host device 100 and the storage device 200 may communicate. The second bus portion 410 may include the entire second bus 400 or may only include a portion of the second bus 400.

Accordingly, the processor in the host device 100 may access the data stored in the nonvolatile memory device 210 through the second bus 400 such as SATA bus, NVMe bus, SAS bus, etc. using the second bus portion 410.

Figure 9:
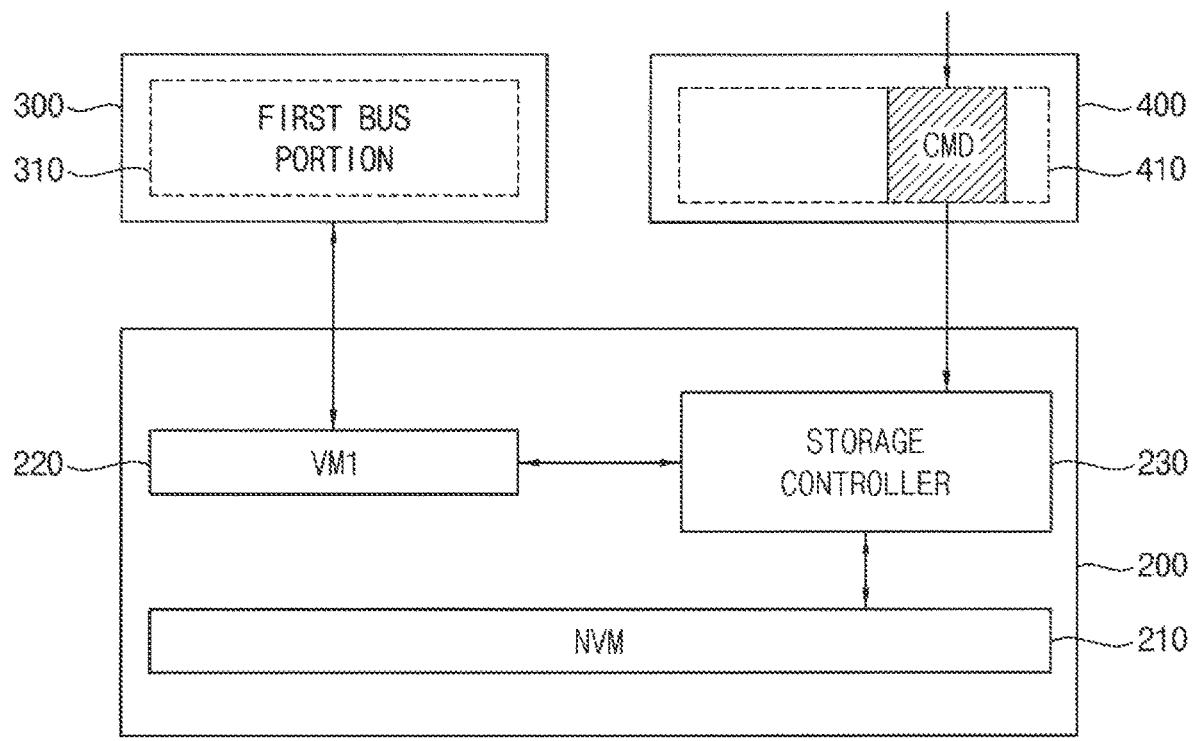
FIG. 9 is a diagram for describing an example operation of the storage system of FIG. 8.

FIG. 9 is a diagram for describing an example operation of the storage system of FIG. 8.

In some example embodiments, as illustrated in FIG. 9, the cache controller in the host device 100 may provide a command signal CMD to the storage controller 230 in the storage device 200 via the second interface, that is, via the second bus portion 410. In this case, the storage controller 230 may perform at least one of the load operation, the clean operation, and the invalidating operation based on the command signal CMD provided via the second interface from the cache controller of the host device 100.

As described with reference to FIGS. 1 through 9, in the storage system 10 according to example embodiments, the first volatile memory device 220 in the storage device 200 may operate as a cache memory with respect to the nonvolatile memory device 210 in the storage device 200, and based on the cache table 101 that is generated internally, the host device 100 may read the cache data stored in the first volatile memory device 220 by units of byte using the first bus portion 310 of the PCIe bus 300.

In other words, in the storage system 10 according to example embodiments, even though the storage system 10 does not include a hardware cache, the host device 100 may generate the cache table 101 corresponding to the information on the cache data stored in the first volatile memory device 220 and read the data stored in the nonvolatile memory device 210 by units of byte though the first volatile memory device 220 using the cache table 101 that is generated and stored internally.

As such, in the storage system 10 according to example embodiments, even though the storage system 10 does not include a hardware cache, the host device 100 may read the data stored in the nonvolatile memory device 210 by units of byte though the first volatile memory device 220 by implementing a host-level cache in the host device 100. Thus the storage system 10 according to example embodiments may implement a cache system with low cost to read the data stored in the storage device 200 by units of byte.

Figure 10:
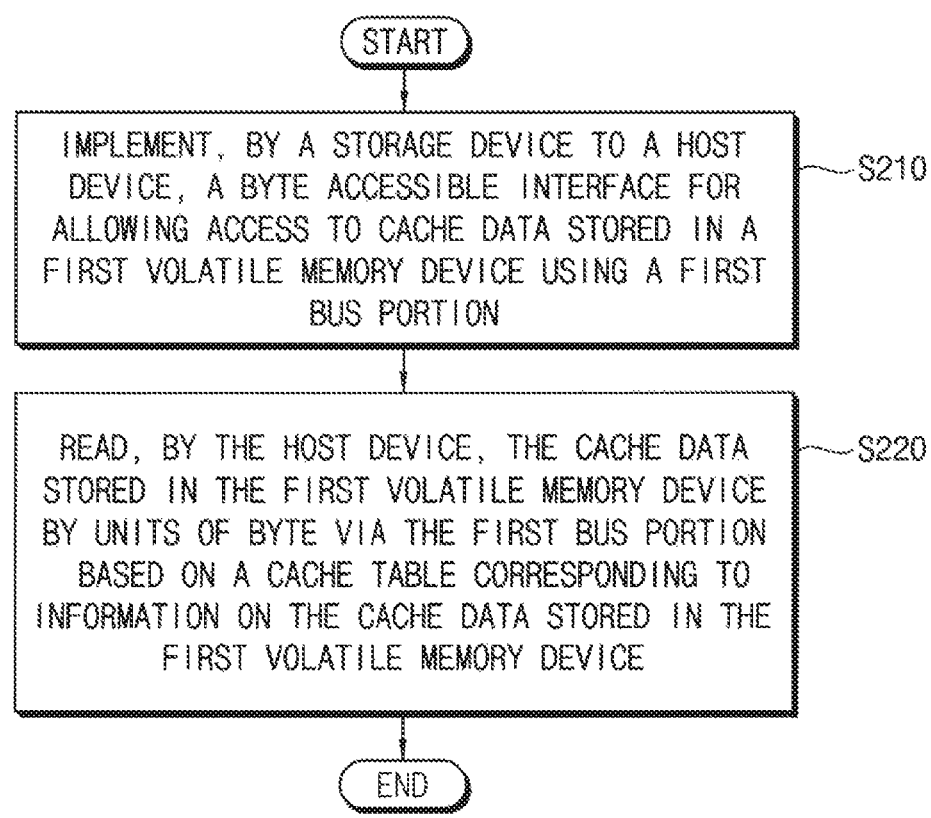
FIG. 10 is a flow chart illustrating a method of operating a storage system according to example embodiments.

FIG. 10 is a flow chart illustrating a method of operating a storage system according to example embodiments.

The method of FIG. 10 may be performed using the storage system 10 of FIG. 1. Hereinafter, the method of operation the storage system 10 is described with reference to FIGS. 1 through 10.

A storage device 200 may implement a byte accessible interface to allow a first bus portion access to cache data stored in a first volatile memory device 220. The first bus portion 310 may have a width evenly divisible into bytes.

The host 100 may read the cache data stored in the first volatile memory device 220 by units of byte via the first bus portion 310 based on a cache table 101 corresponding to information on the cache data stored in the first volatile memory device 220 (S220).

FIG. 11 is a flow chart illustrating an example embodiment of reading cache data stored in a first volatile memory device by units of byte via the first bus portion based on a cache table, which is included in the method of FIG. 10.

Referring to FIG. 11, the cache controller 130 may generate the cache table 101 in which a physical address corresponding to the cache data stored in the first volatile memory device 220 in the first bus portion 310 is mapped to a virtual address corresponding to the cache data in the virtual address space 140 (S221).

The processor 110 may generate a read command READ_C for reading data stored in the nonvolatile memory device 210 by units of byte using the virtual address space 210 (S223)

The cache controller 130 may convert the virtual address in the virtual address space 140 to the physical address in the first bus portion 310 using the cache table 101, where the virtual address is included in the read command READ_C (S225).

The cache controller 130 may read, from the first volatile memory device 210 using the physical address, a copy of data corresponding to the virtual address and stored in the nonvolatile memory device 210 (S227).

Accordingly, in the storage system 10 according to example embodiments, even though the storage system 10 does not include a hardware cache, the host device 100 may read the data stored in the nonvolatile memory device 210 by units of byte though the first volatile memory device 220 by implementing a host-level cache in the host device 100.

The present inventive concepts may be applied to any storage devices and storage systems. For example, the present inventive concepts may be applied to systems such as a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concepts.

What is claimed is:

1. A storage system comprising:
   a storage device including,
   a nonvolatile memory device having a first size,
   a first volatile memory device having a second size smaller than the first size, the first volatile memory device configured to
   operate as a cache memory with respect to the nonvolatile memory device, and
   allow a first bus portion access to cache data stored in the first volatile memory device; and
   a host device configured to,
   initially generate a cache table corresponding to information on the cache data stored in the first volatile memory device, the cache table storing a virtual address in a virtual address space and a physical address corresponding to the cache data stored in the first volatile memory device such that the virtual address is mapped to the physical address, and
   read the cache data stored in the first volatile memory device via the first bus portion based on the cache table.

2. The storage system of claim 1, wherein the host device includes,
   a processor configured to generate a read command for reading data stored in the nonvolatile memory device using the virtual address space, the processor being configured to perform the initially generating of the cache table;
   a second volatile memory device configured to store the cache table; and
   a cache controller configured to
   implement the virtual address space and provide the virtual address space to the processor,
   convert the virtual address in the virtual address space to the physical address of the first volatile memory device using the cache table, the virtual address being included in the read command, and
   read a copy of data corresponding to the virtual address and stored in the nonvolatile memory device from the first volatile memory device, via the first bus portion, using the physical address.

3. The storage system of claim 2, wherein, when the virtual address included in the read command from the processor exists in the cache table, the cache controller is configured to read the physical address corresponding to the virtual address from the cache table and to perform a read operation with respect to a region corresponding to the physical address in the first volatile memory device.

4. The storage system of claim 2, wherein, when the virtual address included in the read command from the processor is not included in the cache table, the cache controller is configured to provide a load request signal to the storage device and the storage device is configured to load data corresponding to the virtual address from the nonvolatile memory device to the first volatile memory device as the cache data in response to the load request signal.

5. The storage system of claim 4, wherein the cache controller is configured to store, in the cache table, the virtual address and the physical address to which the cache data are loaded such that the virtual address is mapped to the physical address, and perform a read operation with respect to a region corresponding to the physical address in the first volatile memory device.

6. The storage system of claim 2, wherein the storage device further includes: a storage controller configured to receive a command signal from the cache controller and configured to perform, based on the command signal, at least one of
   a load operation to load data stored in the nonvolatile memory device to the first volatile memory device as the cache data,
   a clean operation to store the cache data stored in the first volatile memory device to the nonvolatile memory device, and
   an invalidating operation to delete the cache data stored in the first volatile memory device.

7. The storage system of claim 6, wherein the cache controller is configured to store the command signal in a region of the first volatile memory device using the first bus portion, and the storage controller is configured to perform at least one of the load operation, the clean operation and the invalidating operation based on the command signal stored in the region of the first volatile memory device.

8. The storage system of claim 6, wherein the storage device is configured to allow a second bus portion access to data stored in the nonvolatile memory device.

9. The storage system of claim 8, wherein the cache controller is configured to provide the command signal to the storage controller via the second bus portion, and the storage controller is configured to perform at least one of the load operation, the clean operation and the invalidating operation based on the command signal provided via the second bus portion from the cache controller.

10. The storage system of claim 6, wherein the cache controller is configured to copy the cache table from the second volatile memory device to a region of the first volatile memory device via the first bus portion.

11. The storage system of claim 10, wherein the storage controller is configured to backup the cache table from the region of the first volatile memory device to the nonvolatile memory device if the storage device is powered off and restore the cache table from the nonvolatile memory device to a region of the first volatile memory device if the storage device is powered on, and
    the cache controller is configured to copy the cache table via the first bus portion from the region of the first volatile memory device to the second volatile memory device when the storage device is powered on.

12. The storage system of claim 1, wherein the first volatile memory device corresponds to a dynamic random access memory (DRAM) device and the nonvolatile memory device corresponds to a flash memory device.

13. The storage system of claim 1, wherein the host device and the first volatile memory device are configured to communicate through a Peripheral Component Interconnect Express (PCIe) bus, the first bus portion being a portion of the PCIe bus.

14. The storage system of claim 1, wherein
    the first bus portion has a width, the width being evenly divisible into one or more bytes.

15. The storage system of claim 14, wherein
    the width is one byte.

16. A storage device comprising:
    a nonvolatile memory device having a first size;
    a volatile memory device having a second size smaller than the first size, the volatile memory device configured to store cache data for the nonvolatile memory device and to transmit data to a host in response to a request from the host; and a storage controller configured to receive a cache table that is initially generated from the host, the cache table storing a virtual address in a virtual address space and a physical address corresponding to the cache data stored in the volatile memory device such that the virtual address is mapped to the physical address, transfer the cache table to the nonvolatile memory device via the storage controller, and perform one of the following based on a command from the host, load data stored in the nonvolatile memory device to the volatile memory device, transfer data stored in the volatile memory device to the nonvolatile memory device, or delete the data stored in the volatile memory device.

17. The storage device of claim 16 wherein the nonvolatile memory device is configured to receive the command from the host, store the command, and transfer the command to the storage controller.

\* \* \* \* \*